July 30, 1929.  B. C. PLACE  1,722,944
SECURING TRIM PANELS
Filed Jan. 9, 1928
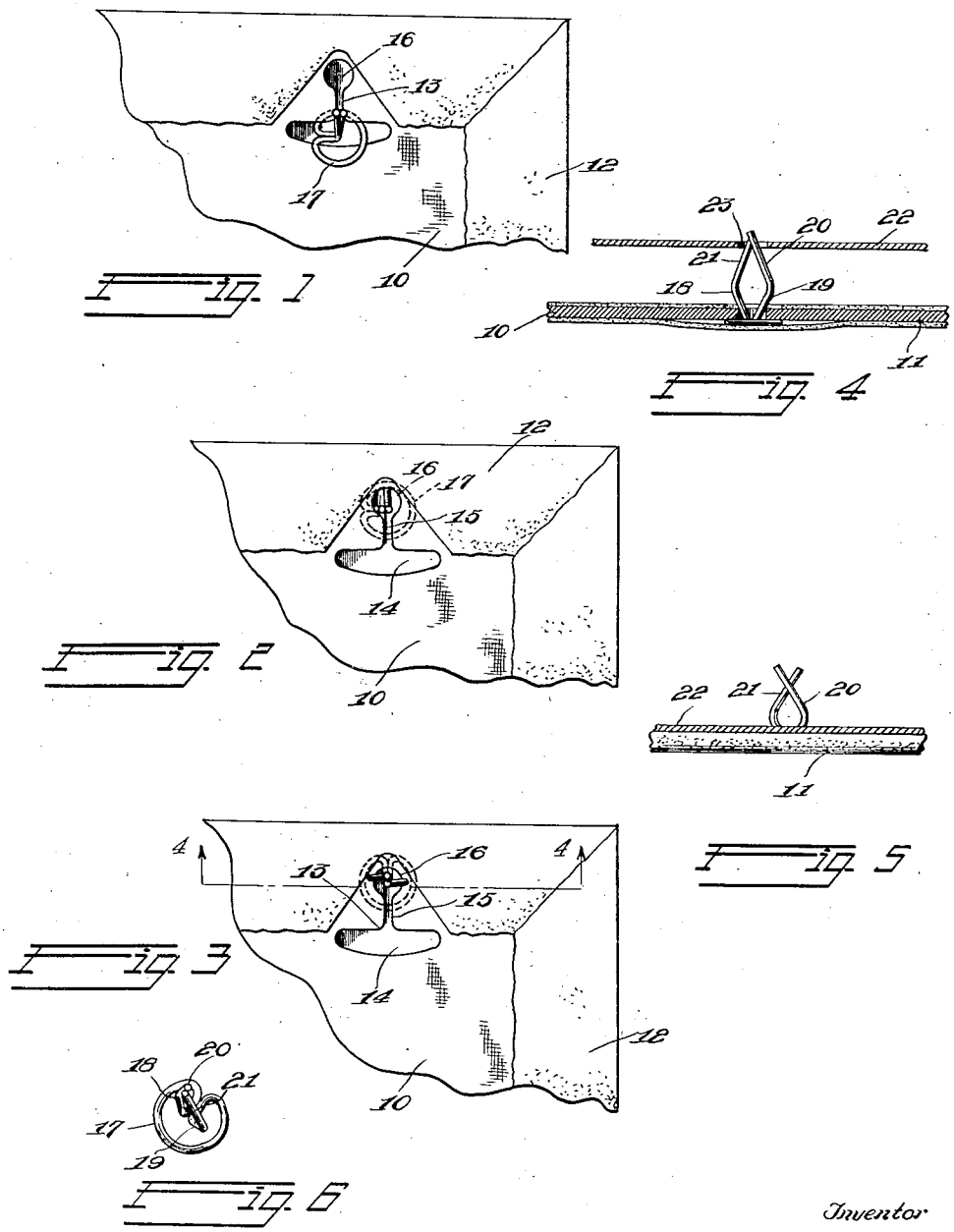
Inventor
Bion C. Place
James C. Hoffman
Attorney Patented July 30, 1929.

1,722,944

UNITED STATES PATENT OFFICE.

BION C. PLACE, OF DETROIT, MICHIGAN, ASSIGNOR OF ONE-HALF TO GEORGE R. GAGNIER, OF DETROIT, MICHIGAN.

SECURING TRIM PANELS.

Application filed January 9, 1928. Serial No. 245,435.

This invention relates to an improved method of and arrangement for securing a panel to a perforated supporting structure of any kind. The invention is especially useful in connection with the attachment of panels to a perforated supporting structure of plate-like form positioned so that only one face of the plate-like supporting structure is readily accessible. The invention is intended to be applied in securing trim panels to the metallic interior portions of automobile bodies though said invention is capable of use in many other relations, and may be applied wherever it is desired to readily secure a panel or similar member to a supporting structure.

The primary object of the invention is to provide a method of and arrangement for securing a trim or similar panel to a supporting structure by means which does not completely penetrate the panel, but that is applied in interlocked relation to the panel by insertion from the rear face thereof, whereby the forward face thereof may remain imperforate, thus presenting a neat appearing and unbroken aspect to the view of the observer of the applied panel.

A further object of the invention is to provide a novel manner of attaching a fastener to the body or foundation of a panel that permits the application of a fabric or similar covering material thereto before the insertion of the fastener. The application of the finishing material to the panel is thus facilitated, since the finishing material may be completely applied without interference caused by protruding fasteners placed in position in said body or foundation before the application of the covering material as heretofore practiced in the art. Moreover, in using this invention the covered panels may be stacked or piled one on the other, without any danger of their being marked or torn by the fasteners projecting from an otherwise smooth inner surface.

A further object of the invention lies in the provision of a panel the body or foundation of which is provided with a novel form of slot that permits the insertion of a headed fastener from the rear face of the body which slot is so formed that the shank thereof, as well as the head, are held from movement in the slot by a simple partial turning of the fastener about a longitudinal axis.

Still further objects of the invention will appear as a description thereof proceeds with reference to the accompanying drawing in which, Fig. 1 is a fragmentary view of a trim panel as seen from the rear face thereof, the headed fastener being shown in its initial position in applying it to the panel.

Fig. 2 is a view similar to Fig. 1 showing the fastener in another position.

Fig. 3 is a similar view showing the fastener in its operative position.

Fig. 4 is a sectional view showing the trim panel with the fastener applied thereto about to be inserted in a perforation in a metallic supporting plate.

Fig. 5 is a sectional view showing the panel applied to the supporting plate.

Fig. 6 is a perspective view of the fastener illustrated in the other figures.

Like reference characters indicate like parts throughout the several figures.

The numeral 10 indicates a portion of a suitable foundation or body for a trim panel for the interior of an automobile body or for any other similar purpose. Said foundation or body may be made out of fibre board, card board or any other suitable material. The foundation or body 10 may be covered on one of its faces by suitable trim material 11 of fabric or similar material, combined with or without a suitable wadding, as may be desired. Preferably the edges of the trim material are wrapped around the edges of the foundation or body as shown at 12 on the drawings.

Before the trim material is applied to the foundation or body 10 said foundation is provided with a suitable number of properly positioned slots 13 of a form suitable for applying a headed fastener to the body or foundation after the trim material has been applied thereto as just described. In the embodiment of the invention illustrated in the drawings one of these slots is shown at 13. Said slot comprises a head receiving portion 14 of relatively great width compared to its length and a communicating shank receiving portion 15 of narrow width compared to its length. The shank receiving portion 15 terminates in an enlarged opening 16 designed to receive the shank of the fastener when it is in its applied position as presently to be described.

A headed fastener that is especially adapted for use in connection with a trim panel such as just described is shown in Fig. 6 of the drawings and is described in detail in my copending application Serial No. 235,638 filed November 25, 1927. Said fastener is preferably constructed from a single piece of wire by bending the wire between its ends to form a head 17 in the form of a loop. The ends of the wire are bent away from the head to provide diverging resilient holding elements 18 and 19 and converging guiding elements 20 and 21, the position of these elements when the fastener is not serving its holding function being shown in Fig. 4 of the drawings. As clearly shown in Figs. 1, 2 and 3 of the drawings the tips of the converging portions 20 and 21 are arranged side by side when the fastener is not in use, the arrangement being such as to facilitate the insertion of said portions in a perforation in a suitable supporting structure.

The fastener shown in Fig. 6 may be applied to the trim panel illustrated in Figs. 1, 2 and 3, after the trim material has been applied to the body or foundation thereof. This may be effected by tilting the head of the fastener so that it may be entered in the portion 14 of the slot 13. At the time the head of the fastener is entered in said portion the diverging and converging portions constituting the shank of the fastener are positioned so that said portions may enter the relatively narrow portion 15 of slot 13. The fastener is then moved from the position shown in Fig. 1 to the position shown in Fig. 2. In this position the fastener is free to be reversely moved out of the portion 15. In order to hold the fastener in this portion of the slot 13 it is turned through an angle of 90°, the part 16 of the portion 15 permitting this movement. The fastener is then in the position shown in Fig. 3 of the drawings, in which position it is not free to move in any direction, but is interlocked with respect to the trim panel.

In the use of this invention the foundation or body 10 is first provided with the desired number of properly located slots 13 as above described. The trimming material is then applied to one face of the foundation or body completing the formation of the trim panel. Such panels may be conveniently constructed since no fasteners are applied to the body or foundation when the cover material is applied thereto. The trim panels thus constructed also may be stacked without injury because of the absence of fasteners that would otherwise mar or tear the finished material if it was sought to stack the panels constructed after the manner heretofore used in the art.

When it is desired to secure a trim panel to a foundation structure of any kind fasteners are inserted in as many slots 13 as may be provided in the panel after the manner above described. The supporting structure, a portion of which is shown in Figs. 4 and 5 of the drawings and indicated by the numeral 22 is provided with suitable perforations such as the perforation 23 positioned so that the parts 16 of slot 13 will approximately register with said perforations when the panel is applied thereto. In view of the resilient nature of the diverging portions 18 and 19 of the panel it will be understood that an exact registry of the part 16 in the slot 13 with the aperture 23 is not required but that an approximate registry will suffice. In automobile bodies one face of the perforated supporting structure is frequently inaccessible. However, in the arrangement above described the action of the fastener is entirely automatic and access need not be had to the rear face of said supporting structure.

The trim panel with the fasteners applied thereto is then simply brought to the position shown in Fig. 4 of the drawings in which the converging portions 21 enter the aperture 23. The trim panel is then pressed toward the supporting structure 22, the guide portions 21 and 20 serving to temporarily move the diverging portions 18 and 19 towards each other to permit the shank of the fastener to enter the aperture 23. As the movement of the trim panel toward the structure 22 is continued the diverging arms spring apart to the position shown in Fig. 5, thus serving to firmly hold the trim panel in engagement with said structure. The application of the trim panel to the supporting structure is thus greatly facilitated and it is possible to remove the trim panel and recover and replace it expeditiously.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

What I claim as my invention is:

1. The method of constructing a trim panel and applying fasteners thereto for application to a supporting structure which consists in providing the foundation of the panel with an opening formed to permit the insertion of a headed fastener therethrough from the rear face thereof and to interlock said fastener therewith, applying the trim material to the front face of said foundation, and then inserting the headed end of a fastener through said opening to interlock it with respect to said foundation.

2. A foundation for a trim panel comprising a body of relatively stiff material provided with an opening one portion of which is formed to permit the insertion of the head of a bodily removable fastener through said body from the rear face thereof and another portion communicating with said first named portion and formed to receive the shank of the fastener with the head out of registry with said first portion to hold the fastener in interlocked relation to said panel whereby the fastener may be applied to said panel from the rear face after the trim material has been applied to the front face thereof.

3. A foundation for a trim panel comprising a body of relatively stiff material provided with an opening, one portion of which is formed to readily permit the insertion of the head of a fastener therethrough from the rear face after the trim material has been applied to the front face thereof, and another portion of which has a part communicating with said first named portion and formed to receive the shank of the fastener in one position and a second part of greater width to receive said shank after it has been turned through a substantial angle about the longitudinal axis of the fastener to retain said fastener in said last named part.

4. In combination, a trim panel consisting of a foundation or body having an opening adapted to pass the head of a headed fastener applied from the rear face thereof, and shaped to interlock said fastener and said foundation or body, and an imperforate covering applied to the front face thereof, a fastener interlocked with said foundation or body through said opening and a supporting structure having a perforation receiving a portion of said fastener to hold said trim panel in said structure.

5. In combination, a trim panel consisting of a foundation or body having an opening adapted to pass the head of a headed fastener applied from the rear face thereof and shaped to interlock said fastener and said foundation or body, and an imperforate covering applied to the front face thereof, a fastener interlocked with said foundation or body, through said opening and having resilient diverging holding portions, and a supporting structure having a perforation receiving said resilient diverging portion to hold said trim panel to said structure.

BION C. PLACE.